(12) United States Patent
Sharma (10) Patent No.: US 8,452,707 B2
(45) Date of Patent: May 28, 2013

(54) CREDIT CARD, CREDIT CARD SYSTEMS AND METHOD

(76) Inventor: Bansi Lal Sharma, Morristown, NJ (US)

(*) Notice: Subject to any disclaimer, the term of this patent is extended or adjusted under 35 U.S.C. 154(b) by 246 days.

(21) Appl. No.: 12/658,703

(22) Filed: Feb. 12, 2010

(65) Prior Publication Data

US 2010/0153244 A1    Jun. 17, 2010

Related U.S. Application Data

(63) Continuation-in-part of application No. 11/986,614, filed on Nov. 23, 2007, now abandoned.

(51) Int. Cl.
- *G06Q 30/04* (2012.01)
- *G06Q 20/04* (2012.01)
- *G06Q 40/02* (2012.01)
- *G06Q 20/14* (2012.01)
- *G06Q 20/02* (2012.01)

(52) U.S. Cl.
USPC ............................................................ 705/40

(58) Field of Classification Search
CPC ................................. G06Q 30/04; G06Q 20/04
USPC ............................................................ 705/40
See application file for complete search history.

(56) References Cited

U.S. PATENT DOCUMENTS

| | | | |
|---|---|---|---|
| 5,884,271 A | 3/1999 | Pitroda | 705/2 |
| 5,949,044 A * | 9/1999 | Walker et al. | 235/379 |
| 5,984,180 A | 11/1999 | Albrecht | 235/380 |
| 6,267,292 B1 | 7/2001 | Walker et al. | 235/379 |
| 6,402,039 B1 | 6/2002 | Freeman et al. | 235/492 |
| 6,473,500 B1 | 10/2002 | Risafi et al. | 379/144.01 |
| 6,615,189 B1 | 9/2003 | Phillips et al. | 705/41 |
| 6,631,849 B2 | 10/2003 | Blossom | 235/492 |
| 6,796,497 B2 * | 9/2004 | Benkert et al. | 235/380 |
| 7,128,261 B1 | 10/2006 | Henderson et al. | 235/383 |
| 7,165,049 B2 | 1/2007 | Slater | 705/41 |
| 7,263,507 B1 | 8/2007 | Brake, Jr. et al. | 705/41 |
| 2002/0026418 A1 | 2/2002 | Koppel et al. | 705/41 |

(Continued)

FOREIGN PATENT DOCUMENTS

JP    2001/222665    8/2001

OTHER PUBLICATIONS

Visa Buxx at www.usbank.visabuxx.com/index.cfm?s=vbusbkw12.

*Primary Examiner* — Daniel S Felten
*Assistant Examiner* — Clifford Madamba
(74) *Attorney, Agent, or Firm* — Ernest D. Buff; Ernest D. Buff & Assoc. LLC; Harry Anagnos (57) ABSTRACT

A credit card and credit card payment system includes a zero-LOC card account having an associated zero-LOC card with a unique identification number and a zero line of credit. The issuer of the zero-LOC card assumes no credit risk. This zero-LOC card account is independent of a funding card account, such that the zero-LOC card is funded, at some point before use, by at least one funds transfer from the funding card account to provide a positive credit balance in the zero-LOC card account. At the point of use, zero-LOC card functions just like a regular credit card except for the fact that a debit/payment transaction on the zero-LOC card is authorized using the available credit balance on the zero-LOC card account instead of the available line-of-credit as in the case of a regular credit card.

24 Claims, 3 Drawing Sheets

U.S. PATENT DOCUMENTS

| | | | |
|---|---|---|---|
| 2002/0143703 A1 | 10/2002 | Razvan et al. | 705/44 |
| 2003/0053609 A1 | 3/2003 | Risafi et al. | 379/114.2 |
| 2003/0195842 A1 | 10/2003 | Reece | 705/39 |
| 2004/0064412 A1 | 4/2004 | Phillips et al. | 705/41 |
| 2004/0249752 A1 | 12/2004 | Prato et al. | 705/41 |
| 2005/0077350 A1 | 4/2005 | Courtion et al. | 235/380 |
| 2007/0187487 A1 | 8/2007 | Wilen | 235/380 |
| 2008/0086759 A1* | 4/2008 | Colson | 726/2 |

* cited by examiner

CREDIT CARD, CREDIT CARD SYSTEMS AND METHOD

CROSS-REFERENCE TO RELATED APPLICATIONS

This application is a continuation-in-part of U.S. application Ser. No. 11/986,614, filed Nov. 23, 2007 now abandoned, for "Credit Card Payment System And Method."

BACKGROUND OF THE INVENTION

1. Field of the Invention

The present invention relates to a credit card payment system and method; and more particularly to a credit card payment system and method including a credit card having a unique identification number and a zero line of credit (except for an optional overdraft limit), henceforth referred to as a zero-LOC card or a zLOC card, issued to an individual or a small business, that is funded by a money transfer from a funding card account's available line of credit.

2. Description of the Prior Art

Fewer and fewer individuals carry any significant amount of cash upon their person. In lieu of carrying cash, credit cards/debit cards have become a mainstay for everyday payments. Credit cards provide tremendous convenience over cash and checks but are not available to a large segment of the population. This is the case even when there are a large number of credit-worthy cardholders who are willing to extend credit to these individuals on a transactional basis but are not willing to become guarantors to get regular credit cards issued to these individuals. Plastic payment cards currently can be grouped into three predominant categories: (i) charge/credit cards; (ii) debit cards; and (iii) prepaid cards.

There also exist systems and methods for facilitating subsidiary card accounts. Existing products take many forms. One such product is a payment and funding vehicle that allows a parent and an administrator to provide funds in the form of a credit line to a subsidiary. The system thereby facilitates control over the subsidiary's spending capacity and/or debt accumulation. The system for administering a subsidiary card account includes a parent and an administrator. The parent, which is responsible for a related credit instrument, e.g., a parent account, requests the administrator to issue a credit card account to a subsidiary. The administrator facilitates the establishment and administration of the subsidiary card account so that it may be used by the subsidiary for payment transactions. The administrator also facilitates the determination and adjustment of appropriate spending power for the parent account and spending capacity for the subsidiary card account in accordance with a predetermined set of rules. A set of rules may require an allocation of risk between the administrator and the parent whereby the spending power of the parent account is reduced by an amount that is less than the credit line, i.e., spending capacity, established for the related subsidiary card account, in accordance with, and reflecting, an allocation of risk to the administrator. In addition, the administrator can facilitate execution of a request from the parent to define, modify, and/or terminate the spending capacity and/or debt accumulation limits for the subsidiary card account.

Various prepaid or gift card systems have been provided, wherein a person generally buys a card with an amount associated with the card for use as a prepaid card (such as a phone/gas card) or as a gift card. For example: U.S. Pat. No. 6,473,500 to Risafi et al. discloses a system for using a prepaid card permitting a card user to purchase a card, issued by an issuer such as a bank, through an agent at a retail establishment via a terminal and use the card to purchase goods and services, and reload the card for future use; U.S. Pat. No. 6,615,189 to Phillips et al. discloses a purchase card that is purchased by a purchaser for a designated recipient, wherein the purchase card may also be converted to a credit card; U.S. Patent Application Publication No. 20030053609 to Risafi et al. discloses a system and method for transferring money by use of a prepaid card account wherein two cards are issued to the user accountholder, one of which is provided to another user, and either user may add value to the prepaid account so that the other user may use the card and that value in a financial transaction; U.S. Patent Application Publication No. 20040064412 to Phillips et al. discloses a method of issuing a purchase card including the steps of presenting a purchaser with the opportunity to buy the purchase card, determining whether the purchaser has sufficient funds, creating a purchase card account, and issuing the purchase card, wherein the purchase card may be issued in connection with another credit card, for example as a rebate for purchases on the credit card, and the purchase card may be converted to a credit card; U.S. Patent Application Publication No. 20040249752 to Prato et al. discloses a method enabling a prepaid, open-ended stored-value charity card to be used as a fundraising vehicle providing dollar-based monetary funding to pre-selected charities; U.S. Patent Application Publication No. 20020143703 to Razvan et al. discloses a cash card which is freely transferable, redeemable and usable and which a user can purchase with a set amount of credit thereon and add to the balance as it is used; U.S. Patent Application Publication No. 20030195842 to Reece discloses a method for making electronic transactions providing a limited-use credit card for use over a network such as the Internet and it has a limited life span and/or a limited spending limit corresponding to the amount of the stored value transaction optionally less a transaction fee; and Foreign Publication JP 2001/222665 to Awano discloses a card settlement system using a credit card.

Gift card type methods and systems generally similar to pre-paid cards have been provided. For example: U.S. Patent Application Publication No. 20070187487 to Wilen discloses a method of distributing and activating gift cards by attaching a non-activated gift card to an article and selling the article to a consumer so that the consumer activates the gift card by allocating a dollar valve to the gift card and then sends the gift card to a specific person as a gift; U.S. Pat. No. 5,984,180 to Albrecht discloses a method and system for providing purchasable value for gifts and other uses in the form of a credit instrument wherein purchaser of a gift credit instrument authorizes a credit institution with which the purchaser holds a credit account to create a limited-value, non-renewable secondary account linked exclusively to the purchaser's credit account, wherein the gift credit instrument may be used in the same manner as the purchaser's credit instrument but it expires after a certain period of time or after the initial value of the secondary account is spent; U.S. Pat. No. 7,128,261 to Henderson et al. discloses a method and apparatus for generating and dispensing gift cards for an associated merchant, wherein a customer enters a value for the gift card through a customer input pad, and pays for the card by swiping a credit card through a credit card reader; and U.S. Patent Application Publication No. 20020026418 to Koppel et al. discloses a method for providing a pre-paid anonymous electronic debit card compatible with an existing network of credit cards so that upon pre-payment by a customer, the issuer issues to the customer a pre-paid electronic debit card, bearing the name of the issuer, for accessing one of the sub-accounts; the customer can receive the card for personal use or send it to a third party, either as a gift or as payment for a purchase.

Devices, including microprocessors, semiconductor chips, or cards having multiple magnetic strips, for storing information via a plurality of cards on one card/device have also been provided. For example: U.S. Pat. No. 5,884,271 to Pitroda discloses a universal electronic transaction card ("UET card") device with microprocessor capable of serving as a number of different credit cards, bank cards, identification cards, employee cards, medical and health care management cards and the like; U.S. Pat. No. 6,402,039 to Freeman et al. discloses a chip card including a flexible body; at least one semiconductor chip supported within the flexible body and comprising a memory for storing the information; and U.S. Pat. No. 6,631,849 to Blossom discloses a selectable, multi-purpose card comprising a plurality of features stored in memory means operatively mounted on the card and selection means for allowing a user to select a feature. In one embodiment the card includes a plurality of magnetic strips to allow swiping each magnetic strip separately.

Dual credit cards and non-credit card devices have been provided wherein a credit account is created along with transactional or debit card features. For example: U.S. Pat. No. 7,263,507 to Brake, Jr. et al. discloses a Customer Activated Multi-Value (CAM) card provides a customer with a primary use as a transaction card which can be further activated to have a secondary use as a credit card; and U.S. Patent Application Publication No. 20050077350 to Courtion et al. discloses a dual card, which facilitates payment for goods or services from either a credit account or a stored value account.

Additionally, various sponsor cards and/card funding vehicles have been provided, but these devices fail to provide a general purpose credit card having a zero line of credit (except for an optional overdraft limit) that is substantially funded by way of existing lines of credit from other credit cards with no limitations on how many times or how often the card is funded from other credit cards. For example: U.S. Pat. No. 7,165,049 to Slater discloses a method and system for issuing a sponsor funded stored value card wherein a sponsor company funds an account associated with the stored value card and the card is issued to a cardholder, who can withdraw funds from the account, but cannot deposit additional funds in the account; Visa Buxx found at URI usa.visa.com/personal/cards/prepaid/buxx_faq.html?it=12|/personal/cards/prepaid/visa_buxx.html|FAQ#anchor_3 discloses a prepaid, reloadable Visa card created especially for teens wherein parents enroll their teen in the program and monitor their teen's spending. Parents can set the spending limits by the prepaid amount loaded on the card. A Visa Buxx card cannot be upgraded to a regular credit card. U.S. Pat. No. 6,267,292 to Walker et al. discloses a financial tender transfer system that allows a transferor to transfer credit or make payments to a transferee by debiting the credit card of the transferor and crediting the credit card of the transferee so that the transferee has immediate access to the transferred money and ensures the transferor's credit card is valid, wherein any amount of value up to the full credit line of the transferor can be transferred to the transferee.

U.S. Pat. No. 6,796,497 to Benkert et al. discloses a flexible limit subsidiary card account in which the administrator/issuer facilitates the determination and adjustment of the appropriate spending power for the parent account, and the spending capacity for the subsidiary card account, in accordance with a predetermined set of rules. The parent is enabled to define and change the spending capacities (e.g., credit limits or other mechanisms for approving or denying an individual transaction) for each subsidiary card account or to cancel one or more subsidiary card account 132 altogether. No disclosure is contained by Benkert et al. concerning a credit card that is issued without need for a credit check, and which derives its spending power through one or more funds transfer transactions which transfer funds from other credit cards into this card's associated account.

US Patent Publication 2008/0086759 to Colson discloses verifying and authenticating the identify of network users. Also disclosed by Colson are systems and methods for setting desired risk or verification levels, for using information from a plurality of sources, and for verifying or authenticating the identify of small business and principals or other employees. Colson does not disclose or suggest a credit card that is issued without need for a credit check, and which derives its spending power through one or more funds transfer transactions which transfer funds from other credit cards into this card's associated account.

None of the references disclose a credit card system adapted specifically for a credit card that is issued without need for a credit check, with such a card deriving its spending power through one or more funds transfer transactions which transfer funds from other credit cards into this card's associated account. Moreover, none of these card systems provide a plastic payment instrument especially adaptable for multiple end uses capable of being tailored for specific uses, such as: (i) a teen credit card with specific limits, that can later on be graduated to a regular credit card; (ii) a budget credit card to compartmentalize one's spending; (iii) an enhanced privacy protection credit card; (iv) a plurality of cards with user-controlled spending limits (for distribution within a family or small business) that are all funded dynamically by the user from another credit card; (v) a published credit card that can be used to receive payments for goods and services from other credit cards; or (vi) a credit card used to give a personal loan or gift to a friend, associate or a family member.

Notwithstanding the efforts of prior art workers to construct various credit and prepaid cards, there remains a need in the art for a credit card payment system that includes a credit card having a unique identification number and a zero line of credit (except for an optional overdraft limit) issued to an individual or a small business that is funded by transaction(s) transferring funds from another independent credit card account to provide a credit balance on the zero-LOC credit card. In addition, there exists a need for a credit card payment system that includes a zero-LOC credit card having sub-product codes that can be used to enable additional restrictions or expansions for the zero-LOC card to yield varying credit card vehicles, including, but not limited to, variations such as: (i) a teen credit card with specific limits that can later on be graduated to a regular credit card; (ii) a budget credit card to compartmentalize one's spending; (iii) an enhanced privacy protection credit card; (iv) a plurality of cards with user-controlled spending limits (for distribution within a family or small business) that are all funded dynamically by the user from another credit card; (v) a published credit card that can be used to receive payments for goods and services from other credit cards; or (vi) a credit card used to give a personal loan or gift to a friend, associate or a family member.

SUMMARY OF THE INVENTION

The present invention provides a credit card system and method for payment for goods or services that includes a credit card having a unique identification number and a zero line of credit (except for an optional overdraft limit), and henceforth referred to herein as a zero-LOC card or also a zLOC card, issued to an individual or a small business, that is funded by a money transfer from a funding card account's available line of credit to provide a credit balance on the zero-LOC card. The credit card payment system further includes sub-product codes that can be used to enable additional restrictions or expansions for the zero-LOC card to yield varying credit card vehicles, including, but not limited to, variations such as: (i) a teen credit card with specific limits that can later on be graduated to a regular credit card; (ii) a budget credit card to compartmentalize one's spending; (iii) an enhanced privacy protection credit card; (iv) a plurality of cards with user-controlled spending limits (for distribution within a family or small business) that are all funded dynamically by the user from another credit card; (v) a published credit card that can be used to receive payments for goods and services; or (vi) a credit card used to give a personal loan or gift to a friend, associate or a family member.

Storage means are provided for storing the identification number and the sub-product code for the zero-LOC card. Computing means are provided for calculating the credit balance remaining on the zero-LOC card and for approving or declining a payment using the zero-LOC card. The system further includes communication means for transmitting and receiving between the computing means the transaction information including the zero-LOC card identification number, or a proxy, and a payment transaction amount.

A method for providing a zero-LOC credit card is provided. The method comprises the steps of: generating a zero-LOC card having a unique identification number and a zero line of credit (except for an optional overdraft limit); issuing the zero-LOC card to an individual or a small business; funding the zero-LOC card by at least one funds transfer from a funding card account to provide a credit balance on the zero-LOC card; creating a sub-product code that can be used to enable additional restrictions or expansions for the zero-LOC card; storing the identification number and the sub-product code for the zero-LOC card on storage means; calculating the credit balance remaining and for approving or declining a payment made using the zero-LOC card; and transmitting and receiving between the computing means the transaction information including the zero-LOC card identification number, or a proxy, and a payment transaction amount.

BRIEF DESCRIPTION OF THE DRAWINGS

The invention will be more fully understood and further advantages will become apparent when reference is made to the following detailed description of the preferred embodiments of the invention and the accompanying drawings, in which.

DETAILED DESCRIPTION OF THE INVENTION

The present invention provides a credit card system and method for payment for goods or services that includes a credit card having a unique identification number and a zero line of credit (except for an optional overdraft limit), henceforth referred to as a zero-LOC card or a zLOC card, issued to an individual or a small business, that is funded by a money transfer from an independent funding card account's available line of credit to provide a credit balance on the zero-LOC card. The credit card payment system further includes sub-product codes that can be used to enable additional restrictions or expansions for the zero-LOC card to yield varying credit card vehicles, including, but not limited to, variations such as: (i) a teen credit card with specific limits that can later on be graduated to a regular credit card; (ii) a budget credit card to compartmentalize one's spending; (iii) an enhanced privacy protection credit card; (iv) a plurality of cards with user-controlled spending limits (for distribution within a family or small business) that are all funded dynamically by the user from another credit card; (v) a published credit card that can be used to receive payments for goods and services; or (vi) a credit card used to give a personal loan or gift to a friend, associate or a family member.

It is an object of the instant invention to solve the problem of allowing an individual or entity to have a zero line-of-credit credit card whose credit balance can be used, in lieu of the line-of-credit, to authorize credit card payments made with the use of that card.

It is an object of the instant invention to solve the problem of allowing individual and other entities to underwrite another credit card with a one-time funds transfer from their existing credit card(s) without creating any additional credit risk for the issuer of the funding credit card, because the said entity assumes full financial responsibility for the transaction by consuming a part of the existing line-of-credit available on the funding credit card It is an object of the instant invention to solve the problem of allowing individuals and entities to be able to exercise some control over a target payment instrument, primarily by choosing the amount of money they transfer from their existing credit card(s) to the target payment instrument, while at the same time not impacting in any other way the financial independence of the target payment instrument or assuming any financial liability for the use of the target payment instrument beyond paying for the one-time funding transaction.

A credit card, as used herein below, is part of a system of payments named after the small plastic card issued to users of the system. It is a card entitling its holder to buy goods and services based on the holder's promise to pay for these goods and services. The issuer of the card grants a line of credit to the consumer (or the user) from which the user can borrow money for payment to a merchant or as a cash advance to the user. Usage of the term "credit card" to imply a credit card account is a metonym.

A charge card, as used herein below, is a plastic card that provides an alternative payment to cash when making purchases in which the issuer and the cardholder enter into an agreement that the debt incurred on the charge account will be paid in full and by due date (usually every thirty days) or be subject to severe late fees and/or restrictions on card use. Though the terms charge card and credit card are sometimes used interchangeably, they have distinct protocols of financial transactions: a credit card is a revolving credit instrument that does not need to be paid in full; no late fee is charged so long as the minimum payment is made at specified intervals (usually every thirty days), which carries the balance forward as a loan incurring interest. A debit card (also known as a check card), as used herein below, is a plastic card that provides an alternative payment method to cash when making purchases. Functionally, it can be called an electronic cheque, as the funds are withdrawn directly and immediately from the bank account associated with the debit card. In some cases, the card accounts are designed exclusively for use on the Internet, and so there is no physical card. Like credit cards, debit cards are used widely for telephone and Internet purchases, and unlike credit cards the funds are transferred from the bearer's bank account instead of having the bearer pay back at a later date.

A stored-value card, as used herein below, refers to monetary value on a card not in an externally recorded account and differs from prepaid cards where money is on deposit with the issuer similar to a debit card. One major difference between stored value cards and prepaid debit cards is that prepaid debit cards are usually issued in the name of individual account holders, while stored value cards are usually anonymous. The term stored-value card means the funds and or data are physically stored on the card. With prepaid cards the data is maintained on computers affiliated with the card issuer. The value associated with the card can be accessed using a magnetic stripe embedded in the card, on which the card number is encoded; using radio-frequency identification (RFID); or by entering a code number, printed on the card, into a telephone or other numeric keypad.

In accordance with the credit card payment system and method, existing credit cardholders are in charge of utilizing their assigned lines of credit (LOCs) in creative ways to address their individual needs. Embodiments of the instant credit card system provide a new generation of credit cards (in the form of zero-LOC cards) appointed for use in conjunction with extant credit card payment systems. Embodiments of the instant invention have several unique and useful features. These features include:
  (i) the line of credit for the zero-LOC card is zero ($0.00) or optionally a relatively small amount to provide a measure of overdraft protection; and
  (ii) payments into the zero-LOC card account (i.e. funding the zero-LOC card) can only be made by transferring money from another credit card account.

Figure 1:
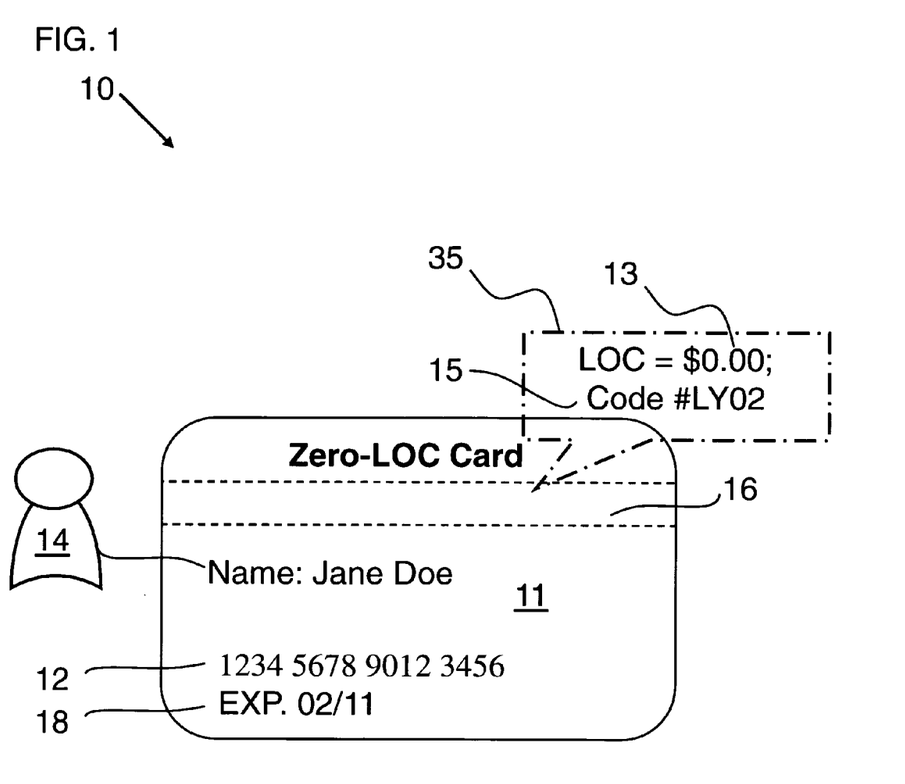
FIG. 1 illustrates a zero-LOC card of the credit card payment system and method.
Figure 2:
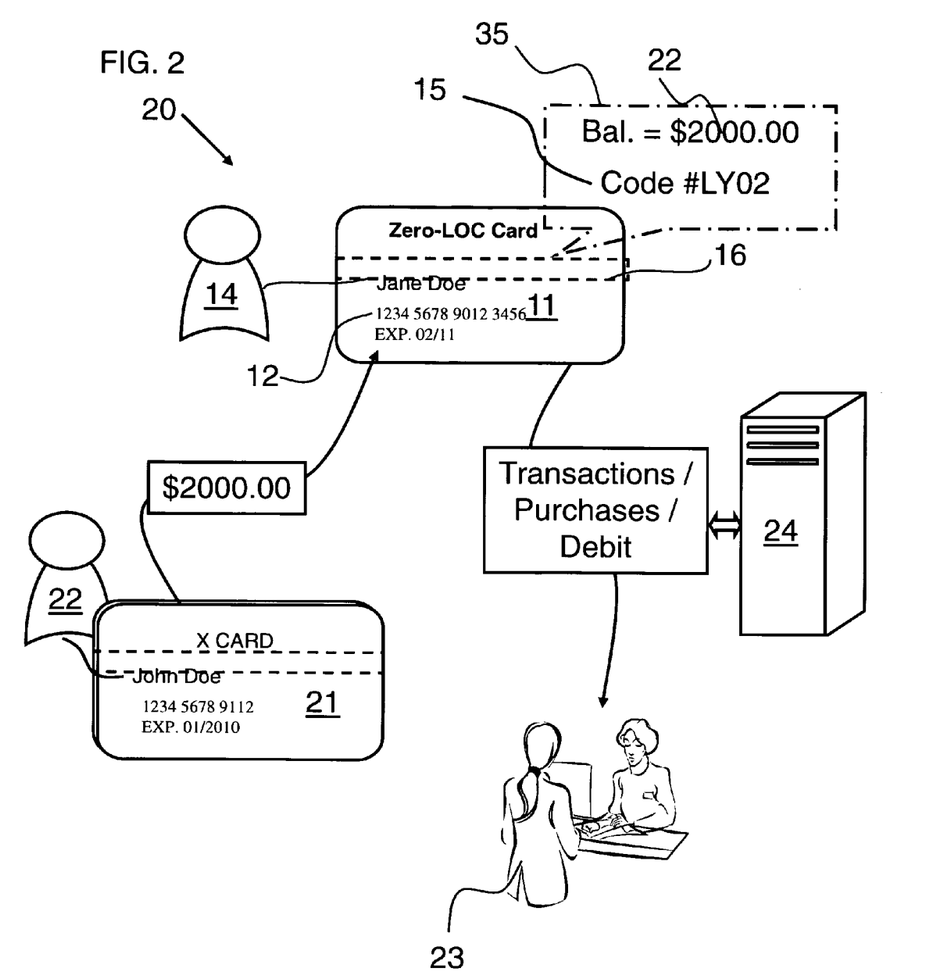
FIG. 2 shows a schematic diagram of an embodiment of the credit card payment system and method wherein the zero-LOC card is being funded by a funds transfer from a funding credit card having a line of credit.

Embodiments of the instant invention can be used in precisely the same manner as a regular credit card, so long as it has a credit balance. Effectively, an "Open To Buy" spending power for the zero-LOC card at any given point in time equals the credit balance on the zero-LOC card account which is continually adjusted with every debit and credit transaction. Advantageously, embodiments of the instant credit card, credit card system and methods require relatively little new technology and servicing infrastructure to be developed or launched. Instead, for the most part existing infrastructure and processes (customer service systems, cardholder and merchant dispute systems, customer statements, interactive voice response systems, internet self-servicing, and the like) can be utilized with enhancements that an artisan of ordinary skill can implement. FIG. 1 illustrates generally at 10 an exemplary zero-LOC card of the instant credit card payment system. FIG. 2 shows generally, at 20, a schematic diagram of an embodiment of the instant credit card system and method. In referring to FIGS. 1 and 2, zero-LOC card 11 has a unique identification number 12, and associated account 35, and a zero dollar amount line of credit 13. In order to issue the zero-LOC card, there is no need for any kind of creditworthiness assessment, because a line of credit is not extended to the zero-LOC card 11 holder. Zero-LOC card 11 is similar to conventional credit cards in that a regular card application, evaluation and card issuance processes can be used to issue zero-LOC card 11, with all the usual evaluation and verification checks on the card applicant, except there is no need to do any creditworthiness assessment. Zero-LOC card 11 is funded by utilizing a portion of an already vetted and approved line of credit, extended to another credit card/funding card account. This funding card account can belong to i) the same individual or to ii) a different cardholder. In other words, the credit underwriting for the zero-LOC card 11, is done by existing cardholders who use their own money (the cardholder who transfers money from their card account to zero-LOC card 11 is responsible for making the payment as they will be billed just as if they had performed a purchase using their credit card or taken a cash advance using their credit card) to enable the zero-LOC card 11 holder to have a credit balance on the zero-LOC card.

As depicted in FIG. 2 the exemplary Zero-LOC card 11 is issued to an individual 14, called Jane Doe. The Zero-LOC card 11 is funded by at least one transfer from a funding card account 21 belonging to John Doe; in this case $2000 is transferred to account 35, which is associated with Mrs. Doe's Zero-LOC card 11, and thus funds a positive credit balance 22 of $2000.00. A sub-product code 15 is associated with optional restrictions or expansions (varying, as discussed hereinbelow, depending on the card product type) to the Zero-LOC card 11. Storage means 16 for storing identification number 12 and sub-product code 15 are provided. Sub-product code and credit balance are preferably stored on a back-end host system, although for illustration purposes, they are shown here as an adjunct to the card number, etc. stored on the magnetic stripe. Computing means and communication means via server 24 are activated by a processing machine, for calculating current credit balance 22 remaining and for approving or declining a payment made to a merchant using the zero-LOC card, or for approving a debit transaction 23. The communication means is appointed to transmit and receive between computing means and sale or debit transaction identification number 12 and a charge cost comprised of a price for goods or services or debit transaction amount. A card expiration date 18/date triggering an event may be provided. The physical card characteristics for the zero-LOC card conform to applicable industry standards and the applicable institutional standards used by the card issuer.

The Zero-LOC card 11 can only be funded by transferring money from another card 21 account; essentially the instant credit card system provides a mechanism for an existing cardholder to consume a portion of their LOC from card 21 to another cardholder (i.e. the holder of the zero-LOC card) and paying for it by simply having it charged to the funding credit card account. This card-to-card transfer transaction is a unique transaction, which can optionally include pre-selected attributes, such as a transfer fee (charged to the transferor, the transferee, to both or neither—fixed fee or variable fee based on transfer amount or a combination thereof), and/or an exchange rate and fee (for transfers across cards with differing currency denominations). Issuance of the zero-LOC card 11 is just like any other credit card. It involves a regular card application, evaluation, verification and card issuance process. Preferably, at least one of the funding card accounts is a credit card having a credit line, so that the credit balance of the zero-LOC card is funded by making a charge against the credit line of the funding credit card. As such the positive credit balance extended to the zero-LOC card is underwritten by the funding credit cardholder. It should be noted that there is no requirement for the timing of the funds transfer transaction or transactions, except in so for as at least one funding transaction is needed for the zero-LOC card to acquire a credit balance before the zero-LOC card can be used to make a payment.

All the usual checks on the card applicant are applied. However there is no need to do any creditworthiness assessment, since no credit is actually extended by the card issuer to the zero-LOC card applicant; rather, the zero-LOC card 11 is funded by utilizing a portion of an already vetted and approved line of credit (LOC), extended to another credit cardholder. In other words, for a zero-LOC card, the credit underwriting is carried out by existing credit cardholders, who use their own money to fund a zero-LOC cardholder. In essence the cardholder who transfers money from their credit card account to a zero-LOC card account is responsible for paying that amount back to their credit card issuer as per their agreement with their credit card issuer, and thus they will be billed just as if they had performed a purchase or taken a cash advance using their own credit card. By extending the ability to underwrite credit to zero-LOC cardholders (at no additional risk to the card issuer) tens of millions of existing credit card cardholders can underwrite, based on their own judgment of who they want to lend/give money to and why. As a loose analogy, just as AMAZON® makes books published/created by others easily accessible for purchase, zero-LOC cards provide a way to make existing credit (that has already been vetted for creditworthiness) easily accessible to more people without increasing the overall credit risk in the financial system. No new credit is being created, just existing lines of credit are being put to use more flexibly. Essentially, the existing unused lines of credit, which are already available to creditworthy individuals, are being made accessible to additional customers whose creditworthiness need not be evaluated by card issuers, but rather by millions of credit cardholders who take full financial liability for their "underwriting" activities. Just as the Internet enabled pervasive self-servicing, zero-LOC cards operate collectively to enable pervasive self-underwriting.

A zero-LOC card is not a prepaid card. Rather it is more like a credit card. While the card issuer is not taking any credit risk on the use of the zero-LOC card, all zero-LOC card spending is backed and enabled by credit extended to the credit card accounts that fund the zero-LOC card Zero-LOC card is the umbrella product under which numerous specific card products can be created to cater to varying needs of the customers. Following is a partial list of examples of zero-LOC card based products. The product labels are merely illustrative and are provided for ease of reference, and should not be construed as limiting in any fashion. Furthermore, the linkages between the funding card accounts and zero-LOC card accounts, enabled through the use of the sub-product codes, as envisaged in the following examples, are "convenience linkages" delineated herein to illustrate myriads of ways in which zero-LOC cards can be used. While such linkages can be enabled and supported by card issuers for customer convenience, they do not require or imply any contractual financial liability linkage between funding credit cards and zero-LOC cards and, therefore, do not in any way compromise the essentially independent and free-standing nature of the zero-LOC cards. Alternatively, these linkages can be maintained by the cardholders themselves, if they so choose, by mutual agreement between cardholders, without requiring any support from the card issuing institutions.

Teen Card: One type of zero-LOC card includes a Teen zero-LOC card wherein funding is allowed only from a single funding card account (e.g. parent's card account) with a linkage maintained between the parent's credit card account and the teen zero-LOC card account. In this embodiment, the zero-LOC card is appointed for use by a young adult. A sub-product code can be used to implement restrictions on the zero-LOC card use with specific categories of merchants and/or goods and services. These categories of merchants and/or goods and services restricted by the sub-product code may include gambling establishments, liquor stores, alcohol and tobacco products, etc. The sub-product code may also employ restrictions that disallow any change of address or other account modifications to the zero-LOC teen card. Such changes can only be done by the funding card account holder, i.e. the parent. Optional features may further include: (1) online statement only products (i.e. automatically suppress paper statements for this sub-product); and (2) parent access to view transaction history for the teen zero-LOC card. A teen zero-LOC card can be graduated to a regular credit card by simply changing the sub-product code, thereby severing the linkage to the parent funding account and associated restrictions, and assigning a LOC greater than zero, with all transaction history potentially being preserved. It should be noted that the linkage to parent's credit card account is optionally maintained to enable parental control and supervision over teen cardholder's spending behavior as desired by the parent voluntarily funding the teen zero-LOC card account at his/her discretion. While the zero-LOC card invention enables such parental control through the use of sub-product codes as a desirable convenience, the instant invention does not require such a linkage to function as a payment instrument.

Enhanced "Debit Card": Another type of zero-LOC card includes a credit card wherein funding is allowed only from a cardholder's own card account(s) (different card account(s) from the zero-LOC card account) with a linkage maintained between the funding credit card account(s) and the zero-LOC card for full transaction/balance visibility and money transfers back and forth between the funding account(s) and the zero-LOC card account. This presumes that one of the predominant reasons people use a Debit Card is to budget their spending on certain categories of spend. Herein, the sub-product code includes restrictions on the funding card account(s) by requiring the funding card account(s) to belong to the same individual or small business to which the zero-LOC card is issued. A linkage is maintained for full transaction/balance visibility and money transfers between the zero-LOC card and the funding card account(s) of the individual or small business.

A cardholder can simply get a zero-LOC card issued to him/her and transfer money from their regular credit/charge card product(s) to the zero-LOC card as desired. Thereafter, they can use the zero-LOC card just as they use a Debit Card with the assurance that they cannot exceed the self-established spending limit. For advanced features and protection, an additional "paid up balance" value can be maintained for such a zero-LOC card, which reflects how much of the available LOC (i.e. current credit balance) has been fully paid up by the Funding Card Account owner, i.e. a portion of the current credit balance on the zero-LOC card account can/should be treated as cash balance and the remaining is credit extended from another credit/charge card account that has not been fully paid up yet. Knowing the size of both portions comprising the current available line of credit (LOC) on the zero-LOC card account, different levels of authorizations for various transactions using the zero-LOC card (e.g. purchases vs. cash advance vs. bill payment on another account vs. a refund check and so on) can be provided.

Optional features may include: (1) online statement only product; (2) rewards points making this product superior to traditional Debit Cards; (3) pay interest on the credit balance (possibly with a built-in delay before the interest starts accruing to ensure interest is paid on zero-LOC card only for funds that remain unutilized for a certain period of time, say a month, to allow for bill payment on the Funding Card Account to have occurred before the interest accrual on the zero-LOC card account balance starts); (4) alternatively, award additional "kicker" rewards points in lieu of cash interest; (5) "overdraft protection" for a fee or a "small overdraft protection" for no fee but based on history of good financial track record on the account; (6) offer enhanced privacy features on this type of zero-LOC card sub-product to make this even more suited for online spend by offering additional peace of mind against identity theft; (7) maintain most of the personal details like address, phone number(s), etc. only on the Funding Card Account and have none of these details maintained on the zero-LOC card account.

Any servicing interactions on the zero-LOC card account would then require the cardholder to identify themselves using the card number and other authentication information on their Funding Card Account. So if the zero-LOC card information is stolen on the internet or from a merchant database system, the fraudster(s) cannot trick their way into obtaining any additional cardholder information. If the zero-LOC card is lost or stolen, the cardholder can simply transfer all of the outstanding balance out of the zero-LOC card, and into their regular card account(s), thereby rendering the zero-LOC card "empty" and unusable. In other words, such a zero-LOC card can be used as a safer and well controlled transaction account. Of course, address information from the Primary Funding Account will need to be automatically accessed, when needed, for address verification, mail order purchases, etc.

Figure 3:
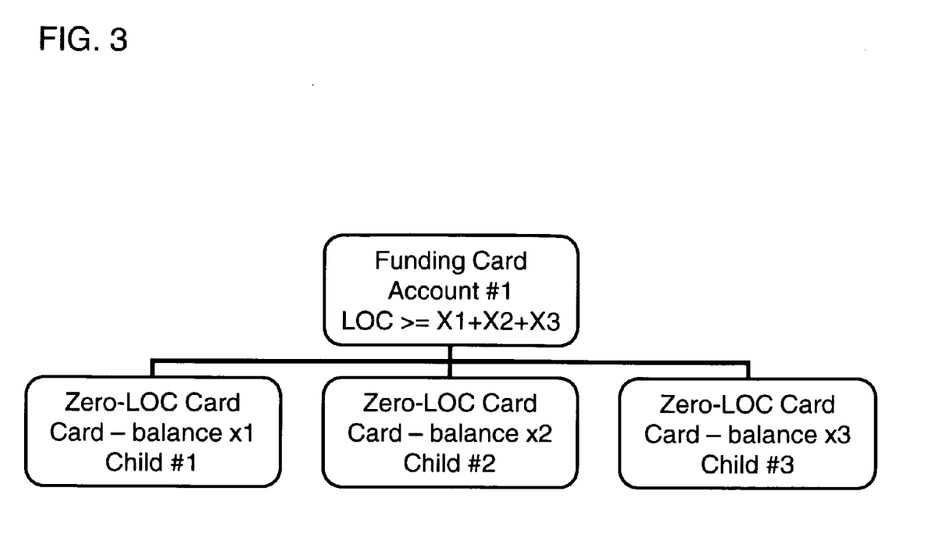
FIG. 3 is a flow chart showing an embodiment of the credit card payment system wherein enhanced supplementary cards are provided via a plurality of zero-LOC cards issued for distribution within a family.

Privacy Card: Another variant of a zero-LOC card may be provided as a privacy card wherein one uses a zero-LOC card exclusively to front underlying Funding Credit/Charge Card account(s) and one does not use the underlying Funding Credit/Charge Card(s) at all. As a matter of fact, issuance of the plastic for the underlying Credit/Charge Card can be suppressed since in this case it will no longer be needed. In this embodiment, the funding card accounts will only be used for billing, receiving and applying bill payments and credit risk decisions, while the privacy zero-LOC card will be used for all purchases, etc.

eSupps (Enhanced Supplementary Cards): Another variant of the zero-LOC cards is in the form of enhanced supplementary cards wherein a plurality of zero-LOC cards is offered for distribution within a family or small business. FIG. 3 is a flow chart showing an embodiment of the eSupps concept. Herein, a plurality of zero-LOC cards each having a unique identification number are provided, wherein each of the zero-LOC cards are appointed to be issued to different individual cardholders in a family and each of the zero-LOC cards are funded by respective transfers from a funding card account to provide varying credit balances on each of the zero-LOC cards. The zero-LOC cards in this case are assigned a specific sub-product code associated with additional restrictions or expansions so that different budgetary controls can be exercised for different supplementary cardholders. For example, zero-LOC cards are issued to different family members (child 1, 2 and 3) with budgetary controls over the different zero-LOC cardholders (child 1, 2 and 3) as desired—something that cannot currently be accomplished using traditional Supplementary Cards which all share a single LOC. For example, where a family has a college age child and a high-school aged child, the parents may determine that the college age child's zero-LOC card have a much higher funded credit balance than the high-school aged child's.

These enhanced supplementary cards can also be provided in the construct of a small business wherein various employees of a small business are given a zero-LOC card each. Herein, a plurality of zero-LOC cards each having a unique identification number and a zero line of credit are provided, wherein each of the zero-LOC cards are appointed to be issued to different individual employees in a business and each of the zero-LOC cards are funded by respective transfers from a funding business card account to provide varying credit balances on each of the zero-LOC cards. Each of the zero-LOC cards have a specific sub-product code associated with additional restrictions or expansions so that different budgetary controls can be exercised for each of the zero-LOC cards. The business owner, having been assigned a LOC for the overall business, can choose to utilize the LOC in differing amounts for different employees and change the individual employee spending limit at will as needed by transferring money between the zero-LOC card accounts and the funding account. Optionally, further automatic transfers between zero-LOC card accounts and the funding account may be offered based on customer defined transfer rules (as to how much, when and in which direction) to make it a highly customizable product for each small business customer.

Payments Lockbox: Another variant of a zero-LOC card can provide for a payment lockbox wherein the zero-LOC card cardholder can publish his/her zero-LOC card account number to his/her customers/clients and ask them to make payments for goods and services via transfers from their credit cards to this zero-LOC card account instead of sending checks or paying cash. Optional features may include institution of a transaction fee for transfers made into this sub-product. The fee can be charged to the recipient's account (i.e. the zero-LOC card account), since it improves the recipient's cash flow through potentially quicker payments and saves the recipient the administrative overhead of processing checks, cash, etc.

Personal Loan/Gift Card: Another variant of a zero-LOC card can be provided as a card used to facilitate a personal loan or gift wherein the individual or small business holder of the zero-LOC card seeks loan(s) from third parties by seeking funding of the credit balance of the zero-LOC card through third party loan transfers. Presumably used by individuals who either have run into a temporary cash-flow problem and have friends willing to help, or others (e.g. new immigrants) with no credit history who have friends and family who are willing to extend credit to them. The zero-LOC cardholder may even pay cash to the friend or family member to pay off the loan, and thus plasticize the cash. Remember, while there is no credit underwriting done for the zero-LOC cardholder by the card issuer, usual fraud vetting before and after issuing the zero-LOC card needs to be performed. Such fraud vetting combined with the transaction history audit-trail for both givers and receivers will enable fraud detection and prevention measures necessary to address money laundering concerns. Optional features may include such features as institution of a transaction fee for transfers made into this sub-product. The fee can be charged to the giver's account or the recipient's account.

All these variations assume sub-product codes 15 that can be used to attach specific restrictions or expansions to the core zero-LOC card product to launch a whole new card product line in the marketplace. Products named above are descriptive placeholders, which will be replaced by more appropriate and compelling product names by marketers when launching such products. An attractive (and very powerful) aspect of the zero-LOC credit card system is the fact that existing cardholders are in charge of utilizing their assigned LOCs in creative ways to address their individual needs. Credit cards provide tremendous convenience over cash and checks but are not available to a large segment of the population even when there are a large number of creditworthy cardholders who are willing to extend credit to these individuals on a transactional basis but are not willing to become guarantors to get regular credit cards issued to these individuals. The embodiments of the instant zero-LOC credit card system allows cardholders to plasticize their unused credit lines at their own expense and to the mutual benefit of consumers, small businesses, merchants and credit card issuing companies, thereby facilitating more frictionless trade and growing the economy.

It should be noted that the zero-LOC credit card is independent of the funding source/credit card, though there can be optional linkages between the funding card and zero-LOC card as discussed earlier with regard to the examples of Enhanced "Debit Card" and Teen Card. For example, consider the case where some issue with the funding card or the associated line of credit were to occur, e.g. if the owner of the funding card missed several scheduled payments and the line of credit was lowered or withdrawn. The issuer of the funding card would be able to pursue the "owner" of the funding card to recoup their losses. In contrast, just as the issuer would not be able to necessarily go after any merchant that was paid using the now defunct line of credit (LOC), they would not necessarily be able to go after the money transferred to the zero-LOC card, or its "owner", from the funding source nor would the zero-LOC card's "owner" be adversely affected. Though in the case where owners of both the funding card and zero-LOC card were the same person, the card issuer would be able to attempt collection, but only because the cardholder was responsible for the funding source's line of credit, not because the cardholder "owned" the zero-LOC card that received the funding.

It is to be noted that though the embodiments of the zero-LOC card were discussed in relation to a physical plastic card it is contemplated that embodiments of the instant invention can take other forms, including no actual physical form factor, and the zero-LOC card may be made from other materials, as would be recognized and known by the artisan of ordinary skill in the credit card industry.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A credit card payment system comprising:
  a. a zero-LOC card account having an associated zero-LOC card with a unique identification number and a zero line of credit wherein an issuer of said zero-LOC card assumes no credit risk thereon, said line of credit having a value of zero dollars ($0.00);
  b. said zero-LOC card account being independent of any underlying financial liability of a funding card account issued by a funding card account issuer, wherein said funding card account, if creditworthy, independently underwrites and transfers funds to said zero-LOC card account without administrative approval from said funding card account issuer, wherein said zero-LOC card account is funded by at least one funds transfer from said funding card account to provide a credit balance in said zero-LOC card account;
  c. a storage means appointed to store said identification number for said zero-LOC card;
  d. a computing means appointed to calculate said credit balance remaining and for approving or declining a payment to a merchant or a debit transaction performed using the said zero-LOC card;
  e. a communication means appointed to transmit and receive between said computing means and said sale or debit transaction said identification number, or a proxy, and a charge cost comprised of a price for said goods or services or debit transaction amount wherein said issuer assumes no credit risk when issuing said zero-LOC card to an individual or a small business with low or no creditworthiness.

2. A system as recited by claim 1, wherein at least one of said funding card accounts is a credit card having a credit line, wherein said balance of said zero-LOC card account is funded by utilizing a portion of said credit line of said funding credit card so that increase in said credit balance of the said zero-LOC card account is underwritten by an obligation of the said funding credit cardholder to the issuer of the funding card in the same amount as has been transferred to the zero-LOC card account.

3. A system as recited by claim 1, wherein said funding card account is issued to a third party.

4. A system as recited by claim 1, wherein said individual or small business holder of said zero-LOC card seeks loans from third parties by seeking funding of said credit balance of said zero-LOC card through third party loan transfers.

5. A system as recited in claim 1, further comprising a sub-product code being associated with additional restrictions or expansions to said zero-LOC card and storing said sub-product code in said storage means.

6. A system as recited by claim 5, wherein said zero-LOC card is appointed for use by a young adult to yield a teen zero-LOC card, wherein funding is allowed only from a single card account, and wherein said sub-product code includes restrictions on use of said teen zero-LOC card with specific categories of merchants and/or goods and services.

7. A system as recited by claim 6, wherein said categories of merchants and/or goods and services restricted by said sub-product code includes gambling establishments, liquor stores, alcohol and tobacco products.

8. A system as recited by claim 6, wherein said teen zero-LOC card is appointed to transform to a regular credit card with all transaction history preserved after a period of time/an event by simply adjusting said sub-product code and assigning a new line of credit greater than zero.

9. A system as recited by claim 6, wherein said sub-product code includes an information restriction code that disallows any change of address or account modifications.

10. A system as recited by claim 5, wherein said sub-product code includes restrictions on said funding card accounts by requiring said funding card accounts to belong to said individual or small business to whom said zero-LOC card is issued, wherein a linkage is maintained for full transaction/balance visibility and funds transfers between said zero-LOC card account and said funding card accounts of said individual or small business.

11. A system as recited by claim 10, wherein said balance of said zero-LOC card account comprises of a "paid up" cash portion and a "backed by credit" portion.

12. A system as recited by claim 11, wherein different levels of authorization are provided for use of said "paid up" cash portion and said "backed by credit" portion of said zero-LOC card.

13. A system as recited by claim 10, wherein use of said zero-LOC card at a merchant can link said merchant with information maintained in association with said funding card account, including personal details like address and phone number(s), for the purposes of a given transaction between the zero-LOC cardholder and said merchant, with any servicing interactions on said zero-LOC card requiring said individual to identify themselves using a card number and other authentication information belonging to said funding card account.

14. A system as recited by claim 5, wherein said zero-LOC card is utilized for all purchases and said funding card account information is not accessible so that privacy of said funding card account is maintained and said funding card account will only be used for billing, bill payments and credit risk decisions.

15. A system as recited by claim 5, wherein a plurality of zero-LOC cards, with each card having a unique identification number and a zero line of credit are provided, and wherein each of said zero-LOC cards are appointed to be issued to different individual cardholders in a family and each of said zero-LOC cards are funded by respective transfers from a funding card account to provide varying credit balances on each of said zero-LOC cards.

16. A system as recited by claim 15, wherein each of said zero-LOC cards comprises a specific set of one or more of said sub-product codes associated with said additional restrictions or expansions to each of said zero-LOC cards so that different budgetary controls are provided for each of said zero-LOC cards.

17. A system as recited by claim 5, wherein a plurality of zero-LOC cards each having a unique identification number and a zero line of credit are provided, and wherein each of said zero-LOC cards are appointed to be issued to different individual employees in a business and each of said zero-LOC cards are funded by respective transfers from a funding business card account to provide varying credit balances on each of said zero-LOC cards.

18. A system as recited by claim 17, wherein each of said zero-LOC cards comprises a specific set of one or more of said sub-product codes associated with said additional restrictions or expansions to each of said zero-LOC cards so that different budgetary controls are provided for each of said zero-LOC cards.

19. A system as recited by claim 5, wherein said individual or small business holder of said zero-LOC card can publish said unique identification number of said zero-LOC card to customers or clients so that said customers/clients of said individual or small business can directly transfer payments from their credit cards to said account of said zero-LOC card for services or goods rendered.

20. A system as recited by claim 19, further comprising a transaction fee assessed to said individual or small business holder of said zero-LOC card for transfers to said account of said zero-LOC card.

21. An electronic credit card payment system comprising:
   a. a zero-LOC card having a unique identification number, said zero-LOC card being issued to a user by an issuer;
   b. said zero-LOC card being associated with a zero-LOC account, said zero-LOC account having a line of credit with a value of zero dollars ($0.00);
   c. said zero-LOC account being capable of receiving funding by way of one or more electronic money transfers, thereby providing a credit balance on said zero-LOC card;
   d. said zero-LOC card being capable of making payments for goods and services following at least one of said money transfers to said zero-LOC account; and
   e. means for calculating said credit balance remaining and for approving or declining a payment using said zero-LOC card;
   wherein said issuer of said zero-LOC card assumes no credit risk as a result of issuing said zero-LOC card.

22. An electronic credit card payment system as recited by claim 21, where said user is an individual or a small business, said individual or small business having no credit history.

23. An electronic credit card payment system, as recited by claim 21 further comprising a sub-product code associated with said zero-LOC card, wherein said sub-product code imposes additional restrictions that limit the use of said zero-LOC card.

24. An electronic credit card payment system as recited by claim 21, where said funding is transferred from a credit card belonging to a third party.

\* \* \* \* \*